(12) United States Patent
Zhou et al.

(10) Patent No.: US 12,028,223 B2
(45) Date of Patent: Jul. 2, 2024

(54) CAPACITY AWARE CLOUD ENVIRONMENT NODE RECOVERY SYSTEM

(71) Applicant: Microsoft Technology Licensing, LLC, Redmond, WA (US)

(72) Inventors: Shandan Zhou, Kirkland, WA (US); Sam Prakash Bheri, BlackDiamond, WA (US); Karthikeyan Subramanian, Redmond, WA (US); Yancheng Chen, Redmond, WA (US); Gaurav Jagtiani, Kirkland, WA (US); Abhay Sudhir Ketkar, Redmond, WA (US); Hemant Malik, Redmond, WA (US); Thomas Moscibroda, Bellevue, WA (US); Shweta Balkrishna Patil, Sammamish, WA (US); Luke Rafael Rodriguez, Portland, OR (US); Dalianna Victoria Vaysman, Chesapeake, VA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/833,238

(22) Filed: Jun. 6, 2022

(65) Prior Publication Data

US 2023/0396511 A1    Dec. 7, 2023

(51) Int. Cl.
| | | |
|---|---|---|
| *G06F 11/00* | (2006.01) | |
| *G06F 11/22* | (2006.01) | |
| *G06F 11/34* | (2006.01) | |
| *H04L 41/0659* | (2022.01) | |

(Continued)

(52) U.S. Cl.
CPC .......... *H04L 41/149* (2022.05); *G06F 11/008* (2013.01); *G06F 11/2263* (2013.01); *G06F 11/3442* (2013.01); *H04L 41/0661* (2023.05); *H04L 41/0668* (2013.01)

(58) Field of Classification Search
CPC ............... G06F 11/008; G06F 11/2263; G06F 11/3442; G06F 11/3447; H04L 41/0661; H04L 41/0668; H04L 41/149
See application file for complete search history.

(56) References Cited

U.S. PATENT DOCUMENTS

| | | | |
|---|---|---|---|
| 9,645,899 B1 * | 5/2017 | Felstaine | G06F 11/2035 |
| 2019/0163528 A1 * | 5/2019 | Zhou | G06F 9/5083 |
| 2020/0285525 A1 * | 9/2020 | Agarwal | G06F 11/3024 |

(Continued)

FOREIGN PATENT DOCUMENTS

WO    2020206699 A1    10/2020

OTHER PUBLICATIONS

"International Search Report and Written Opinion Issued in PCT Application No. PCT/US23/018782", dated Jul. 17, 2023, 14 Pages.

*Primary Examiner* — Marc Duncan
(74) *Attorney, Agent, or Firm* — Schwegman Lundberg & Woessner, P.A.

(57) ABSTRACT

A computer implemented method includes receiving telemetry data corresponding to capacity health of nodes in a cloud based computing system. The received telemetry data is processed via a prediction engine to provide predictions of capacity health at multiple dimensions of the cloud based computing system. Node recoverability information is received and node recovery execution is initiated as a function of the representations of capacity health and node recoverability information.

20 Claims, 5 Drawing Sheets

(51) Int. Cl.
*H04L 41/0668* (2022.01)
*H04L 41/149* (2022.01)

(56) References Cited

U.S. PATENT DOCUMENTS

| | | |
|---|---|---|
| 2021/0208983 A1 | 7/2021 | Lin et al. |
| 2023/0060461 A1* | 3/2023 | Kesavan ................. G06N 5/01 |

* cited by examiner

CAPACITY AWARE CLOUD ENVIRONMENT NODE RECOVERY SYSTEM

BACKGROUND

Cloud platforms provide many different types of virtual machines running on a variety of hardware to meet differing demand requirements of diverse customers. Managing the capacity of cloud platforms while ensuring both high availability and reliability at the same time is a very critical and challenging technical problem.

A cloud platform service is typically partitioned into clusters that each contain numerous compute nodes. In practice, nodes may fail and affect service availability. Maintaining a cloud platform balances allocation and migration of virtual machines from failed nodes into other healthy nodes while marking failed nodes as out of service. A competing balance involves fulfilling capacity and reliability promises to customers in the most cost-effective way. A high number of out of service nodes for long durations reduces cloud platform capacity. Consequently, this results in low-capacity fulfillment reliability for customers.

Existing processes of recovering out of production nodes mostly rely on incident reports, email threads, and manual escalations in various systems, which ends up incurring heavy human labor costs and disconnected operations across the cloud platform. This manual approach usually applies when customer deployment failures have already happened, and customer dissatisfaction has occurred. Such a manual process is unsustainable for large scale cloud platforms.

SUMMARY

A computer implemented method includes receiving telemetry data corresponding to capacity health of nodes in a cloud based computing system. The received telemetry data is processed via a prediction engine to provide predictions of capacity health at multiple dimensions of the cloud based computing system. Node recoverability information is received and node recovery execution is initiated as a function of the representations of capacity health and node recoverability information.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. Fax example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Figure 1:
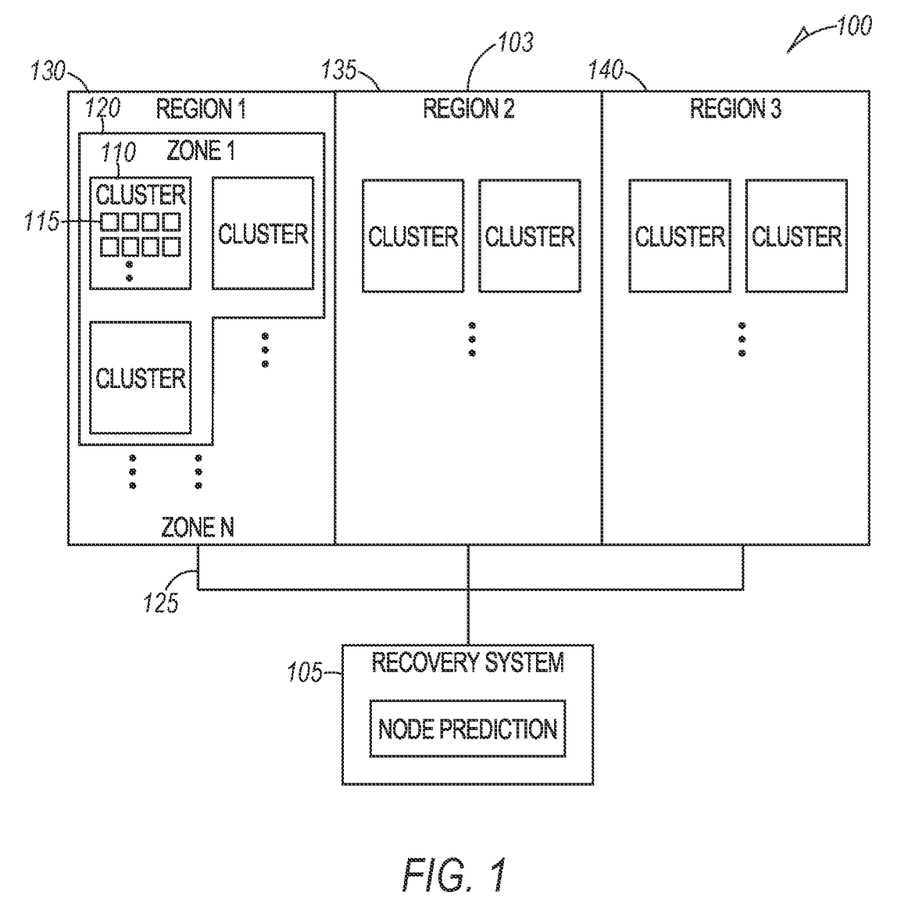
FIG. 1 is a block diagram of a system that includes a cloud platform system coupled to a recovery system according to an example embodiment.

FIG. 1 is a block diagram of a system 100 that includes a cloud platform system 103 coupled to a recovery system 105. Cloud platforms and cloud-based systems are distributed computing systems, where processing resources may be located in one or more physical locations and accessed via one or more networks. Cloud platform system 103 provides many different types of virtual machines (\ Ms) running on a variety of hardware to meet differing demand requirements of diverse customers. Efficiently managing the capacity of a cloud platform while ensuring high availability and reliability at the same time is a very critical and challenging problem.

Cloud platform systems may be partitioned into clusters 110 that contain numerous compute nodes 115. In practice, nodes 115 may fail and affect service availability. It is desired to proactively detect those nodes 115 with risk of hardware/software failures to enable allocation and migration of VMs into other healthy nodes and mark failed nodes as out of service (OOS) to improve service availability.

For complex and dynamic cloud compute platforms, nodes may fail due to various types of reasons. One goal is to fulfill capacity reliability promises to customers in the most cost-effective way. One example target reliability promise is 99.99%. A high number of out of services for long durations reduces cloud platform capacity. Consequently, this results in low-capacity fulfillment reliability for customers.

The node recovery system 105 utilizes intelligent capacity health prediction and proactive recovery of out of service nodes by taking into account node recoverability policies. In one example, the node recovery system 105 includes a machine learning-based prediction engine or engines that monitor the customer workloads already deployed within various dimensions from received telemetry data from the nodes. In one example, the dimensions may include the clusters 110 of multiple nodes 115, such as 1000 nodes that may each have multiple processor cores, such as 48 cores.

A data center may include multiple such clusters with nodes arranged in equipment racks. An availability zone 120 may include one or more data centers each with one or more clusters 110. The data centers may be coupled to a set of communication lines 125, such as one or more 12 lines. A region 130, 135, 140 may be a geographic region, such as East Coast that may have one or more availability zones 120. Thus the dimensions include varying degrees of computing resources.

In one example the recovery system 105 node prediction engine, in addition to monitoring workloads over various dimensions, predicts the risk of allocation failures and optimizes node recovery by prioritizing node recovery via prediction guided decision making. Allocation failures may occur during processing upgrades that adds capacity, referred to as upgrade allocations. Allocation failures may also occur while processing new deployments, referred to as create allocations. The allocations thus include upgrade allocations and create allocations. The risk of allocation failures may be referred to as the capacity health and may be based on the observed demand and available capacity.

The node recovery system 105 takes this capacity health as an input and appropriately applies a more conservative or a more aggressive recovery policy in a cluster, availability zone, or region depending on the predicted future capacity health. Specifically, in clusters/availability zones/regions with high risk of allocation failures, the node recovery system will start to aggressively speed up the node testing process and put nodes that met the health criteria back into production. For clusters/availability zones/regions with little or no risk of allocation failures, the node recovery system may be more conservative in bringing out of service nodes back into production, hence ensuring higher VM availability. The prediction-guided capacity-aware node recovery system 105 not only can provide improvement of capacity fulfillment reliability, but also leads to a reduction of capital expenditure and cost of providing service because of an improved proportion of healthy capacity in the cloud platform.

Figure 2:
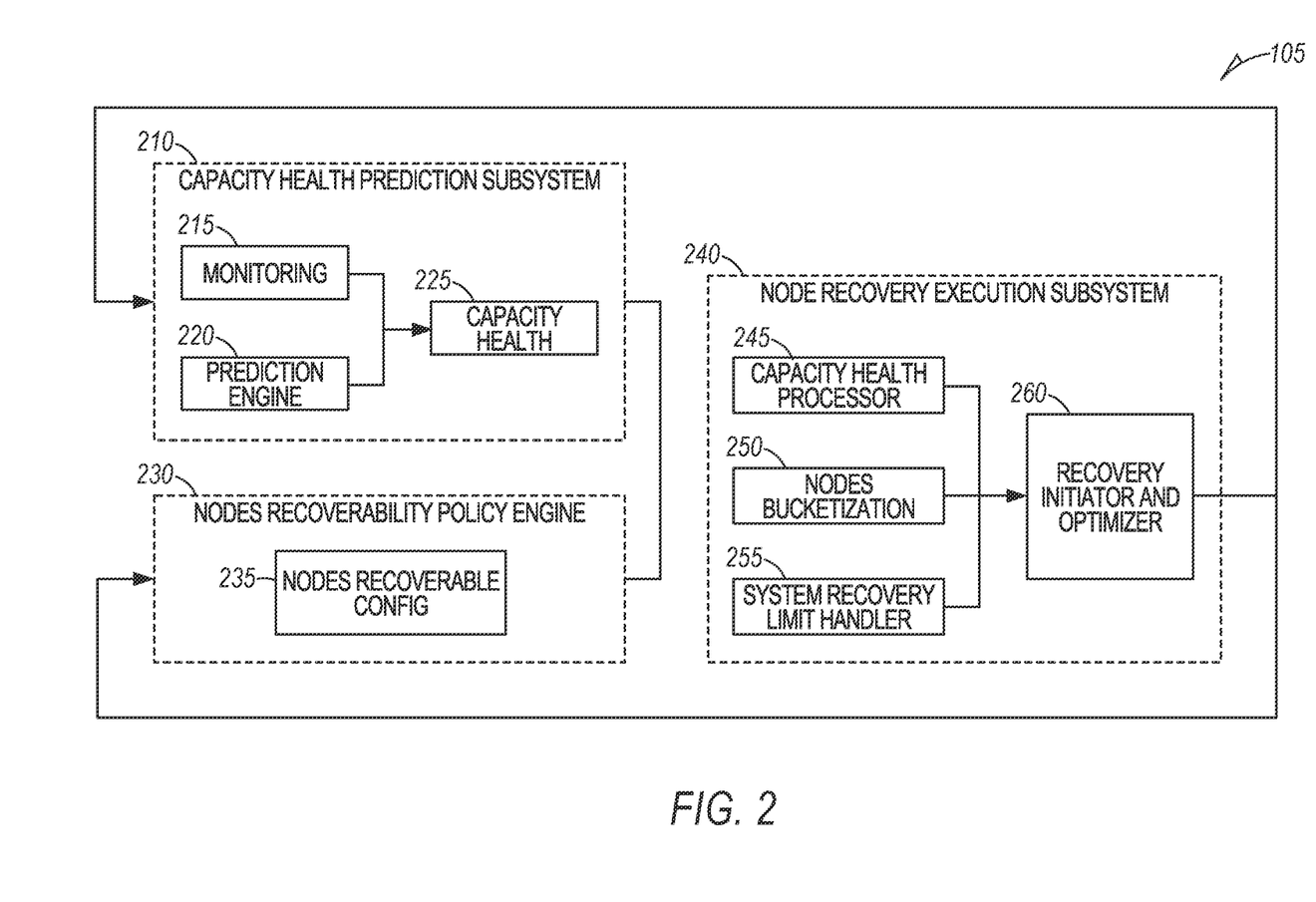
FIG. 2 is a block diagram showing further detail of a node recovery system according to an example embodiment.

FIG. 2 is a block diagram showing further detail of a node recovery system 105. Node recovery system 105 includes a capacity health subsystem 210 that received telemetry data regarding the status of nodes in the system 103 at a monitoring component 215, which monitors near real-time capacity health of nodes and generates features in a format suitable for machine learning, such as a vector or tensor. A prediction engine 220 receives the features and predicts the capacity health signals 225 for accomplishing various types of deployments at multiple dimensions of the cloud system 103 based on the monitored capacity related telemetries.

In one example, the capacity related telemetries comprise measurable signals related to multiple dimensions that show high correlations with the risk of allocation failures because of capacity shortage. The telemetry data can be dynamically changed as needed. If high related signals are found and high quality telemetry is found, the system can be extended to utilize such signals.

Table 1 shows a sample of features monitored over time at monitoring component 215. The features may be received as time series data where indicated.

TABLE 1 shows examples of the features monitored and used in the prediction engine

| Feature | Description | Time Series |
| --- | --- | --- |
| Intraday Utilization | The percentage of used cores divided by the total cores within a cluster, including the aggregations within the next τ days, such as mean, max, min, variance, 90 percentile, 75 percentile, trend, etc. | Yes |
| Cross-day Utilization | The percentage of used cores divided by the total cores within a cluster, including the aggregations across τ days, such as mean, max, min, variance, 90 percentile, 75 percentile, trend, etc. | Yes |
| Used cores | Physical cores used by tenant | Yes |
| Used nodes | Physical nodes used by tenant | Yes |
| Cluster type | The type VM or family can be supported in a cluster, such as GPU, Fv2 Compute, Compute, XIO Compute, etc. | |
| Region | The region a cluster is located, such as "US East", "Europe West" | |
| Fragmentation Index within a cluster | The fragmentation within a cluster, defined as the sum of available cores in each node divided by the total cores from health nodes, including the aggregations within the next τ days, such as mean, max, min, variance, 90 percentile, 75 percentile, trend, etc. | Yes |
| Allocation failure | The allocation failure due to shortage of capacity | |

As used herein, "utilization data" may refer to any information associated with allocation, deployment, or utilization of resources on a cloud computing system. For example, utilization data may refer states of utilization on a node cluster captured at different points in time (e.g., a snapshot of resource utilization). Examples of utilization data my include a number of nodes and/or node cores on a node cluster having virtual machines or other services thereon, a metric of fragmentation or shape of resource utilization such as a number of empty nodes and/or percentage of node cores in use by virtual machines, and observed trends of utilization over time (e.g., cross-day utilization, intra-day utilization). Utilization data may further include data associated with properties or characteristics of hardware and/or services e.g., virtual machines) on a node cluster. Utilization data may refer to raw data and/or refined or extrapolated data that provides a description of resource utilization on a node cluster for a set of customer deployments.

Cluster features or feature signals may refer to different types of Characteristics or categories of features such as snapshot log data or a utilization log including signals associated with utilization on the node cluster. By way of example, cluster features or feature signals may refer to a current or recent availability of empty server nodes on the node cluster, a difference between a current core utilization and a total capacity of compute cores on the node cluster, or a fragmentation metric based on a ratio of available compute cores in a set of server nodes (e.g., occupied or partially occupied nodes) and a total number of compute cores in the set of server nodes. As a further example, cluster features may refer to property log signals (e.g., characteristics associated with hardware types and/or virtual machine types) and/or event log signals (e.g., update request information).

Consuming the data from the monitored telemetry, the capacity health prediction engine 220 predicts the risk of the upgrade deployment failures within clusters for a given time horizon and predicts the risk of new deployment failures for [region, VM series], and [availability zone, VM series] tuples for a given time horizon. There may be multiple different VM series, which may be thought of as VMs having different configurations that are optimized for specific applications. For example, an application that utilizes an in-memory database may have much larger random access memory capacity than an application that is compute intensive.

In one example, an ensemble machine learning algorithm, which has high predicting power and performance, may be used for the capacity health prediction engine 220. The ensemble machine learning algorithm involves fitting many decision trees on different samples of the same dataset and averaging the predictions. The algorithm may be trained, based on the features that have been converted into tensors and labeled with corresponding historical deployment results. The prediction engine 220 comprises a prediction model that outputs a risk of allocation including a category that characterizes a likelihood of upgrade or new deployment failures. For instance, the prediction model can generate a classification of red, orange, or green corresponding to high, medium, and low risks of allocation failure.

Node recovery system 105 also includes a node recovery policy engine 230 that stores data-driven knowledge on the recoverability of the out of service nodes. In one example of a node recovery policy, a software failure has higher probability of recovery compared with hardware failures. Node recovery policy engine 230 also includes a nodes recoverability confit component 235 where policies can be fine-tuned based on the feedback signal from the node recovery execution subsystem. Telemetry indicative of a node failure may be tagged with a fault code, referred to as a node failure signatures. The fault code can be used to track VM availability. For example, if one node failure signature has higher VM availability impact based on the data collected from the node recovery execution system, the specific node signature can be excluded from the candidate node recovery pool to prevent VM availability impact.

The node recoverability policy engine 230 stores the recoverability of each node failure signature based on an annual interruption rate (AIR), which measures the impacted VM uptime because of node failures. Engine 230 sorts the node recoverability based on the AIR and provides the priority ranking to a node recovery execution system 240. Meanwhile, engine 230 keeps monitoring the telemetry from node recovery execution subsystem for existing and newly generated node failure signatures and updates a priority list.

Apart from automatic data-driven ranking adjustment, node recoverability policy can also accept domain knowledge-based configurations. For example, some types of node failure signatures me be explicitly excluded from the priority list to avoid recovering the nodes with noise AIR impact value.

Node recovery execution subsystem 240 receives the capacity health prediction results from prediction engine 220 at a capacity health processor 245 and node recovery policy information input from the node recoverability policy engine 230, The capacity health processor 245 is a component responsible for consuming the signals provided periodically by capacity health signals 225. The capacity health processor 245 processes this data and determines which clusters need attention in terms of capacity crunch.

At the same time, based on the policy engine 230 inputs, the node recovery execution subsystem 240 bucketizes the out of service nodes based on fault signatures via bucketizer 250 and ranks the nodes that need to be recovered. The nodes are evaluated based on their fault signature. Based on the input policies from node recoverability policy engine bucketizer 250 bucketizes with respect to fault. The bucketization is used to determine which recovery strategy to apply to the nodes.

Example buckets that the node bucketizer utilizes to bucketize the fault signatures include:
1. Nodes with bad hardware fault. Example Disk, motherboard, network interface card is bad on the node,
2. Nodes which failed to install certain packages which are important to create and start a virtual machine.
3. Nodes that were empty (ie hosting no customer vms) when the fault happened.
4. Nodes belonging to some specialty customers. For example customer dedicated hosts and placed in special recovery bucket for such workloads.
5. Nodes that are faulted because they are undergoing decommissioning.
6. Nodes that were offline when the node fault happened.
7, Nodes that faulted due to bit locker issues.
8, Nodes where a first recovery of a node was a failure. Hence the node will be undergoing second recovery.
9. Node that did not recover successfully but were frequently marked with fault in 30 days.
10. Nodes that have been faulted for a long time and have not yet recovered.
11, Nodes that have been asked to have specific type of recovery by the operator or different component that detected this fault.
12. A catch all bucket. For example, if a node doesn't fall into any of the above buckets, the catch all bucket is used for the recover.

Based on input comprising which clusters need attention and the node ranking for recovery needs, the node recovery execution subsystem 240 finds target clusters.

A system recovery limit handler 255 is used to help schedule recovery without adversely affecting service to customers. In general, there are physical limitations on the amount of the recovery traffic that can be handled, supported, and sustained. The recoveries may require a high amount of computational processing. Staggering the recoveries is done to ensure that the system 103 is not too overwhelmed. All such data/information related to scheduling may be stored in this component.

The recovery execution subsystem 240, referred to as an execution subsystem, orchestrates the recoveries over the complete recovery cycle of the node. Meanwhile, the subsystem emits telemetries to track the node recovery status, which provides feedback to the capacity health subsystem and the node recoverability policy engine.

A recovery initiator and optimizer 260 takes input from capacity health processor 245, nodes bucketizer 250 and system recovery limit handler 255, and determines the best recovery strategies. Apart from these, recovery strategies may be based on many other factors like past attempts and past recoveries on the nodes. The recovery initiator and optimizer 260 orchestrates the recoveries over the complete recovery cycle of each of the nodes to be recovered.

Figure 3:
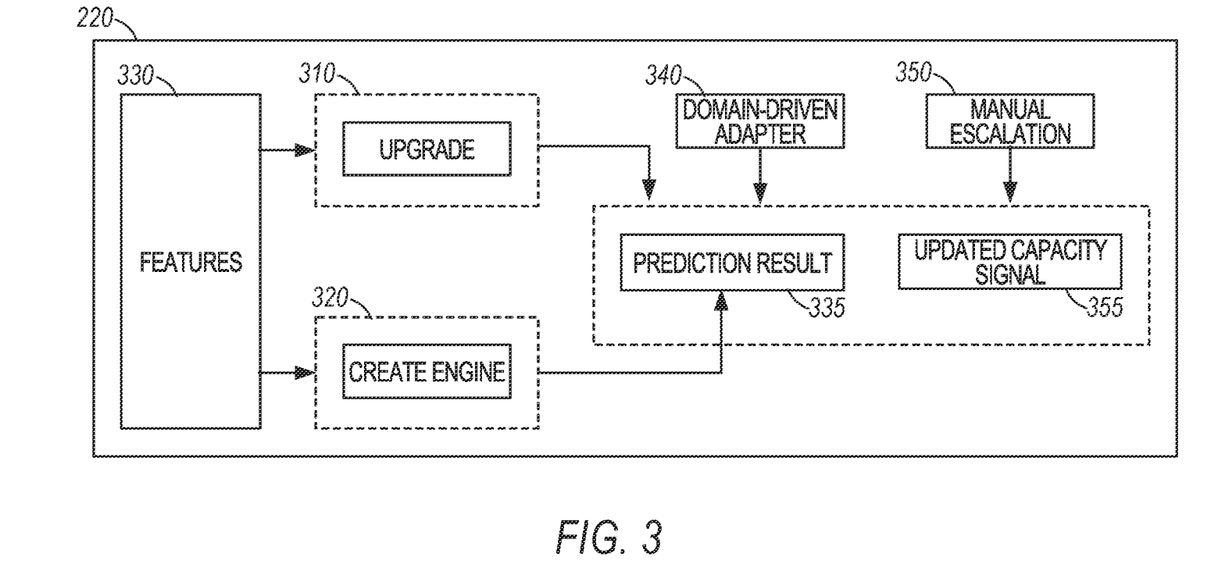
FIG. 3 is a block diagram showing further detail of a prediction engine of the node recovery system according to an example embodiment.

FIG. 3 is a block diagram showing further detail of the prediction engine 220. In one example, two separate prediction engines may be used. An expand/upgrade engine 310 is a capacity health prediction engine for expansion and upgrade deployments and may be used for predicting a risk of upgrade or expansion failure probability. An example failure probability may be identified as 0.9998 for upgrading resources for an existing service. A sample output may include a prediction time, a cluster identifier, a risk bucket, and the risk probability. The risk bucket may be a color, such as red, indicating the upgrade would be very risky without performing recovery. Orange and green may be used for progressively less risky allocations.

A second new deployment engine 320 is a new deployment capacity health prediction engine for predicting failure probabilities for allocating resources for a new service. The output may include a run time, region, VMseries, such as Ev3-Series, and a predicted failure probability, such as 0.72. The probabilities from the engines 310 and 320 may be provided as a prediction result at 335.

Upgrades may require high reliability, which may drive a need to ensure a specific cluster has capacity, as capacity from other clusters or regions may not be able to provide such high reliability. The upgrade prediction engine 310 may operate on a cluster level scope for high reliability upgrades.

The create prediction engine 320 deals with new applications that can be deployed in any clusters within an availability zone or region. The scope level for the create prediction engine 320 may be at a higher level than the upgrade prediction engine 310.

In one example, the prediction result 335 may be augmented with data-driven rule/domain knowledge at 340. For example, in cases where the predictability is extremely low, threshold-based domain knowledge may associate a cluster/availability zone/region with a high risk of allocation failures. A low predictability may be caused by high volatility of demand as seen by spikes in past deployment activity.

Human input may be used as indicated at manual escalation 350 to further adjust the capacity health in emergency cases to produce an updated capacity signal 355 as the output of capacity health prediction subsystem 210. For example, an object type of cluster with an object ID and value, such as 1, may be provided by a human based on configuration management service information indicating failures.

In one example, updated capacity signal 355 may include data at multiple dimensions each having a scope identifying a combination of location, resource type and location, near real time capacity related information, and a projected capacity health. Additional properties, such as cluster type and the number of nodes needed to reduce the risk to a defined level may also be included.

The updated capacity health signal 355 may be a consolidated cluster preference score of $(w_i s_i + w_{i+1} s_{i+1} + \ldots + w_n s_n)$ having a final scaled value of between 0 and 100 for n consolidation inputs, where $w_i$=weight for subscore i, $s_i$=subscore i, $p_i$=priority score for different VM-series.

A Higher cluster preference score denotes a higher risk of capacity shortage for that cluster, availability zone, or region.

For a first iteration i, of the consolidated signals, there are 4 input signals:

Input signal 1: Cluster supported VM series. There may be many such VM series.

Input signal 2: Cluster level health score $w_i$=0.5. Note cluster level health is bucketized into Red, Yellow, and Green. Nodes in one example may be recovered when the capacity health signal is Red. Nodes that have a yellow health may be recovered later.

Input signal 3: AZ level health score ($w_i$=0.3). Similarly, for AZ level health, a mapping table may be used to specify cluster level health.

Input signal 4: Region level health score ($w_i$=0.2). Similarly, for region level health, a mapping table may be used to specify cluster level health.

This possible range of this original number is between [0, 1].

Example 1: Given one general purpose cluster having red health, also belongs to a red availability zone and region, then the $$\text{Consolidated\_cluster\_preference\_score} = w_i s_i + w_{i+1} s_{i+1} + \ldots + w_n s_n 1 * (1*0.5 + 1*0.3 + 1*0.2) = 1 \rightarrow 25$$

Example 2: Given one M-series cluster having red health at cluster level, but not AZ and Region level, then the $$\text{Consolidated\_cluster\_preference\_score} = w_i s_i + w_{i+1} s_{i+1} + \ldots + w_n s_n = 1 * (1*0.5 + 0*0.3 + 0*0.2) = 0.5 \rightarrow 12$$

The capacity health signal 355 may be obtained at a scope of a consolidated cluster in one example. There are multiple options to get the capacity health signal at this scope. Here's an example interface to the capacity health signal 355:

```
{
  "ProjectedCapacityHealth": {
    "PreferenceScore": 1,
    "ProjectedCapacityHealthLevel": "Red"
  },
  "Scope": "by3prodapp09",
  "Version": "1.0.0",
  "Region": "eastasia",
  "PartitionKey": "eastasia"
  "PreciseTimeStamp": "2022-01-20 18:16:18",
  "ScopeID": "consolidatedcluster ",
  "ResourceType": "cluster",
  "id": "by3prodapp09",
  "Location": "AZ02"
  "IsSpecialty": true,
  "ClusterType": "M-series"
}
```

For Out of service node recovery, the capacity health signal 355 comprises data that may be queried at various dimensions referred to as scope, such as ScopeID of consolidatedcluster.

To obtain the capacity health for one Region, an example query is

```
{
"ScopeID": indicate the scope of the signal
"Region": indicate the region of the signal
}
```

To obtain the capacity health for an entire availability zoner, an example query is:

```
{
"ScopeID": indicate the scope of the signal
"Region": indicate the region of the signal
"Location": provide the specific AZ
}
```

To obtain the capacity health for one cluster, an example query is:

```
{
"ScopeID": indicate the scope of the signal
"Region": indicate the region of the signal
"Scope": one specific cluster
}
```

In one example, the capacity signal may be periodically queried in a pull model with node recovery based on the capacity health signal. In terms of frequency of the querying the capacity health signal, once per day or other frequency may be used. The capacity signal 355 may be updated every 30 minutes or other desired frequency. The frequency of updates should be sufficiently spaced to prevent repeated recovery of unlocatable nodes on the same clusters.

A push model may be used in further examples such as in response to urgent capacity recovery being needed. A message may be pushed to the node recovery execution system 240 about the updated capacity health signal.

In one example, the recovery system 105 provides an end-to-end system that automatically decide which and how many nodes should be recovered, and to automatically recover those out of service nodes using a predicted capacity health signal and node recoverability policy. The system predicts the risk of allocation failures within a cluster/availability zone/region for not only the capacity health for existing customer workload to scale, but also the capacity health for new customer workload. The system can accurately predict the risk of existing workload expansion failures based on ensemble machine learning models. The system can also accurately predict the risk of new customer workload deployment failures based on ensemble machine learning models in various capacity pockets.

In one example the system can augment the prediction results with domain knowledge to improve the performance of the capacity health for capacity pockets with low predictability and accept human configuration on capacity health signal in an emergency case.

The system may have a built-in evaluation function that tracks the prediction performance and automatically blocks the prediction signal and triggers alerts for diagnosis. The node recoverability engine may track the out of service recoverability by measuring the impacted VM uptime for different node failures signatures. A priority based on the measured VM availability impact for recovering nodes may be provided when capacity is needed.

The node recovery execution system receives a fully automated capacity health signal and the node recoverability policy, and automatically decides which and how many nodes should be tried to recover, in a way to improve the capacity fulfillment reliability, and simultaneously minimize the VM availability impact.

An example with four nodes, N1, N2, N3, and N4, is used to illustrate operation of the node recovery system. N1 is in cluster C1, N2 is in cluster C2, N3 is in cluster C3, and N4 is in cluster C4. All of the nodes have a respective fault signature (FS), FS1, FS2, FS3 and FS4. All the nodes are fed into the nodes recoverability config component 235.

Out of these 4 nodes, nodes recoverability config component 235 determines only 3 nodes out of 4 are recoverable. Hence nodes recoverability config component 235 selects N1, N2 and N3 and rejects N4. N1, N2 and N3 are then fed to node recovery execution subsystem 240.

The node recovery execution subsystem 240 first calls the capacity health signals 225 application programming interfaces to get the capacity information of all the clusters. This information is collected in capacity health processor 245. Assuming that clusters C1 and C2 have critical capacity issues and C3 has no capacity issue, capacity health processor 245 then determines that nodes from C1 and C2 needs to be recovered with increased priority. Hence only 2 clusters (C1 and C2) are selected by capacity health processor 245 and Cluster C3 is dropped.

Node bucketizer 250 tries to put node N1 N2 and N3 in its appropriate buckets and may not have knowledge that N3 from cluster C3 will not be recovered on priority. Bucketizer 250 only makes sure all the nodes that are recoverable are bucketized and determines that node N1 and N3 with fault signature FS1 and FS3 respectively can be bucketized into a bucket B1 (with recovery action R1), N2 with fault signature FS2 is bucketized into a bucket B2 (with Recovery Action R2).

System recovery limit handler 255 determines what the compute/storage capacity a cluster has for a recovery action. Performing more recovery actions will lead to choking up of the system. System recovery limit handler 255 has this data already fed in the system. Let assume for this example system recovery limit handler 255 determines recovery action R1 can happen 1 per hour, And recovery action R2 can happen 5 per hour, Recovery actions can vary for a node from trying to retrying an operation that filed, resetting the node, rebooting the node, repaving the node, reformatting the node, replacing the node, or repairing or replacing a communication connection to the node. Other recovery actions may also be used. The fault signatures may be used to determine which recovery action or actions to perform.

All the data from capacity health processor 245, node bucketizer 250, and system recovery limit handler 255 is then fed to recovery initiator and optimizer 260. Recovery initiator and optimizer 260 determines that only N1 and N2 needs to be recovered since it has capacity constraints. It initiates recovery R1 on N1 (with 1 per hour rate limit) and R2 on N2 (with 5 per hour rate limit). It waits for recovery to complete either successfully or fail. Lets assume N1 on Cluster C1 was successfully recovered. And N2 on cluster C2 fail to recover. This data is fed to both capacity health signals 225 and node recoverability policy 230.

Since N2 failed, its recovery is retried. But this time since the system knows that R1 policy was not successful. Node bucketizer 250 will recommend policy R3 to be tried on the node N2. System recovery limit handler 255 will specify the rate limits. Assuming the rate limit is 2 per hour, recovery initiator and optimizer 260 then will orchestrate this recovery R3 on node N2. Node N2 gets recovered successfully and the feedback is again given back to capacity health signals 225 and node recoverability policy 230.

Figure 4:
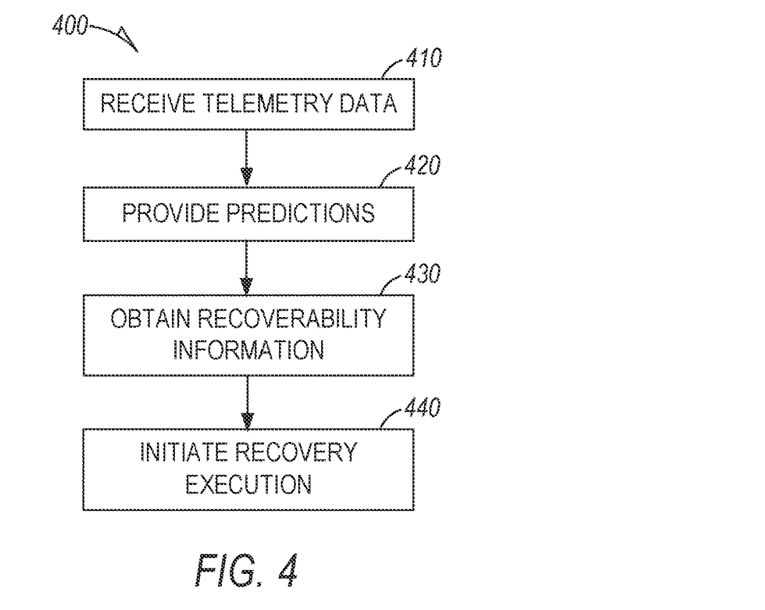
FIG. 4 is a flowchart illustrating a computer implemented method of managing node recovery in a cloud based computing system according to an example embodiment.

FIG. 4 is a flowchart illustrating a computer implemented method 400 of managing node recovery in a cloud based computing system. Method 400 begins at operation 410 by receiving telemetry data corresponding to capacity health of nodes in a cloud based computing system. The received, telemetry data is processed at operation 420 via a prediction engine to provide predictions of capacity health at multiple dimensions of the cloud-computing system. The multiple dimensions may include a node scope, a cluster scope, an availability zone scope, a region scope. The predictions of capacity health may be modified via a rule based domain adapter and by a received manual override input.

Node recoverability information is obtained at operation 430 and operation 440 initiates node recovery execution as a function of the representations of capacity health and node recoverability information. The node recoverability information provides a priority ranking of nodes to recover based on a node failure signature. Node recovery execution may be performed periodically.

The received telemetry data may include for each cluster, a number of used cores, and a number of used nodes. The telemetry data may also include a cluster intraday utilization percentage, a cluster cross-day utilization percentage, identification of a cluster region, a cluster fragmentation index, and allocation failure identifiers.

The prediction engine may be implemented using an ensemble machine learning algorithm trained on historical telemetry data. The prediction engine may be divided into two different machine learning models, including a first model trained to predict upgrade deployment failure risk for a given time horizon and a second model to predict new deployment failure risk for a given time horizon.

Figure 5:
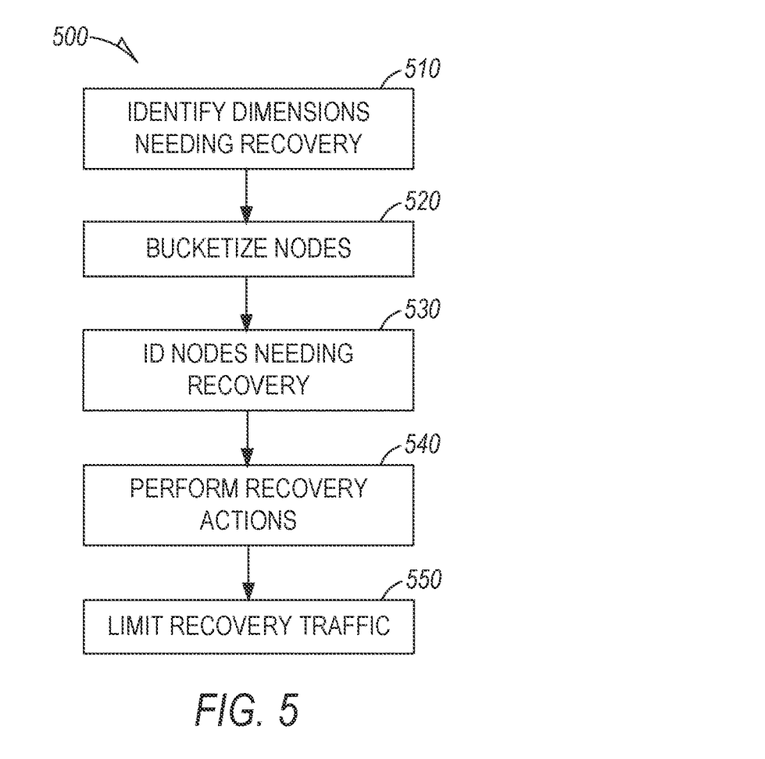
FIG. 5 is a flowchart illustrating a computer implemented method of initiating node recovery according to an example embodiment.

FIG. 5 is a flowchart illustrating a computer implemented method 500 of initiating node recovery, Method 500 begins at operation 510, buy identify dimensions needing recovery. Nodes are bucketized at operation 520 for recovery initiation. Bucketizing nodes comprises grouping nodes into buckets based on faults to identify recovery action strategies corresponding to the faults.

Operation 530 identifies nodes needing recovery. Recovery actions are performed on the nodes at operation 540. At operation 550, recovery traffic may be limited to stagger recovery action resource consumption. Bucketizing nodes may include grouping nodes into buckets based on faults to identify recovery action strategies corresponding to the faults.

Figure 6:
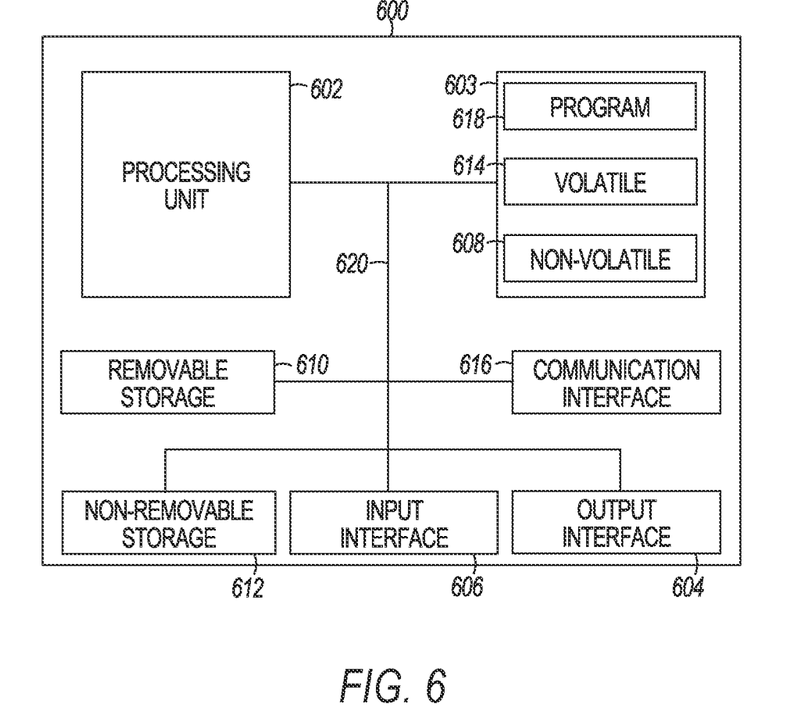
FIG. 6 is a block schematic diagram of a computer system to implement one or more example embodiments.

The recovery actions for a node may include one or more of resetting the node, rebooting the node, repaving the node, reformatting the node, replacing the node, or repairing or replacing a communication connection to the node FIG. 6 is a block schematic diagram of a computer system 600 to implement one or more machine learning models and components for identifying nodes for recovery in a cloud-based system and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve; as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

A computer implemented method includes receiving telemetry data corresponding to capacity health of nodes in a cloud based computing system. The received telemetry data is processed via a prediction engine to provide predictions of capacity health at multiple dimensions of the cloud based computing system. Node recoverability information is received and node recovery execution is initiated as a function of the representations of capacity health and node recoverability information.

2. The method of example 1 wherein the multiple dimensions include a node scope, a cluster scope, an availability zone scope, and, a region scope.

3. The method of any of examples 1-2 wherein the received telemetry data includes for each cluster, a number of used cores, and a number of used nodes.

4. The method of example 3 wherein the received telemetry data includes a cluster intraday utilization percentage and a cluster cross-day utilization percentage, 5. The method of example 4 wherein the received telemetry data includes a cluster region, a cluster fragmentation index, and allocation failure identifiers.

6, The method of any of examples 1-5 wherein the prediction engine includes an ensemble machine learning algorithm trained on historical telemetry data.

7. The method of example 6 wherein the prediction engine includes a first model trained to predict upgrade deployment failure risk for a given time horizon and a second model to predict new deployment failure risk for a given time horizon.

8. The method of any of examples 1-7 and further including
modifying the predictions of capacity health via a rule based domain adapter and modifying the predictions of capacity health via, a received manual override input.

9. The method of any of examples 1-8 wherein initiating node recovery includes identify dimensions needing recovery, bucketizing nodes for recovery initiation, identifying nodes needing recovery, and performing recovery actions on the nodes.

10. The method of example 9 and further including limiting recovery traffic to stagger recovery action resource consumption.

11. The method of any of examples 9-10 wherein bucketizing nodes includes grouping nodes into buckets based on faults to identify recovery action strategies corresponding to the faults.

12, The method of any of examples 9-11 wherein the recovery actions for a node includes at least one of resetting the node, rebooting the node, repaving the node, reformatting the node, replacing the node, or repairing or replacing a communication connection to the node.

13. The method of any of examples 1-12 wherein initiating node recovery execution is performed periodically and wherein the node recoverability information provides a priority ranking of nodes to recover based on a node failure signature.

14. A machine-readable storage device has instructions for execution by a processor of a machine to cause the processor to perform operations to perform any of the method of examples 1-13.

20. A device includes a processor and a memory device coupled to the processor and having a program stored thereon for execution by the processor to perform operations to perform any of the method of examples 1-13.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving telemetry data corresponding to capacity health of nodes in a cloud based computing system;
processing the received telemetry data via a prediction engine to provide predictions of capacity health at multiple dimensions of the cloud based computing system;
receiving node recoverability policy information;
generating a node recovery priority list as a function of the node recoverability policy information; and
initiating node recovery execution as a function of the predictions of capacity health and node recovery policy information, wherein node recovery execution is performed as a function of the node recovery priority list.

2. The method of claim 1 wherein the multiple dimensions include a node scope, a cluster scope, an availability zone scope, and a region scope.

3. The method of claim 1 wherein the received telemetry data comprises for each cluster, a number of used cores, and a number of used nodes.

4. The method of claim 3 wherein the received telemetry data comprises a cluster intraday utilization percentage and a cluster cross-day utilization percentage.

5. The method of claim 4 wherein the received telemetry data comprises a cluster region, a cluster fragmentation index, and allocation failure identifiers.

6. The method of claim 1 wherein the prediction engine comprises an ensemble machine learning algorithm trained on historical telemetry data.

7. The method of claim 6 wherein the prediction engine comprises:
a first model trained to predict upgrade deployment failure risk for a given time horizon; and
a second model to predict new deployment failure risk for a given time horizon.

8. The method of claim 1 and further comprising:
modifying the predictions of capacity health via a rule based domain adapter; and
modifying the predictions of capacity health via a received manual override input.

9. The method of claim 1 wherein initiating node recovery comprises:
identify dimensions needing recovery;
bucketizing nodes for recovery initiation;
identifying nodes needing recovery; and
performing recovery actions on the nodes.

10. The method of claim 9 and further comprising limiting recovery traffic to stagger recovery action resource consumption.

11. The method of claim 9 wherein bucketizing nodes comprises grouping nodes into buckets based on faults to identify recovery action strategies corresponding to the faults.

12. The method of claim 9 wherein the recovery actions for a node comprises at least one of resetting the node, rebooting the node, repaving the node, reformatting the node, replacing the node, or repairing or replacing a communication connection to the node.

13. The method of claim 1 wherein initiating node recovery execution is performed periodically and wherein the node recoverability information provides a priority ranking of nodes to recover based on a node failure signature.

14. A machine-readable storage device having instructions for execution by a processor of a machine to cause the processor to perform operations to perform a method, the operations comprising:
receiving telemetry data corresponding to capacity health of nodes in a cloud based computing system;
processing the received telemetry data via a prediction engine to provide predictions of capacity health at multiple dimensions of the cloud based computing system;
receiving node recoverability policy information;
generating a node recovery priority list as a function of the node recoverability policy information; and
initiating node recovery execution as a function of the predictions of capacity health and node recovery policy information, wherein node recovery execution is performed as a function of the node recovery priority list.

15. The device of claim 14 wherein the received telemetry data comprises for each cluster, a number of used cores, and a number of used nodes.

16. The device of claim 14 wherein the prediction engine comprises:
a first model trained to predict upgrade deployment failure risk for a given time horizon; and
a second model to predict new deployment failure risk for a given time horizon.

17. The device of claim 14 and further comprising:
modifying the predictions of capacity health via a rule based domain adapter; and
modifying the predictions of capacity health via a received manual override input.

18. The device of claim 14 wherein initiating node recovery comprises:
identify dimensions needing recovery;
bucketizing nodes for recovery initiation;
identifying nodes needing recovery;
performing recovery actions on the nodes; and
limiting recovery traffic to stagger recovery action resource consumption.

19. The device of claim 18 wherein the recovery actions for a node comprises at least one of resetting the node, rebooting the node, repaving the node, reformatting the node, replacing the node, or repairing or replacing a communication connection to the node.

20. A device comprising:
a processor; and
a memory device coupled to the processor and having a program stored thereon for execution by the processor to perform operations comprising:
receiving telemetry data corresponding to capacity health of nodes in a cloud based computing system;
processing the received telemetry data via a prediction engine to provide predictions of capacity health at multiple dimensions of the cloud based computing system;
receiving node recoverability policy information;
generating a node recovery priority list as a function of the node recoverability policy information; and
initiating node recovery execution as a function of the predictions of capacity health and node recovery policy information, wherein node recovery execution is performed as a function of the node recovery priority list.

* * * * *